No. 869,021. PATENTED OCT. 22, 1907.
O. ROBERTS.
INTERNAL COMBUSTION ENGINE.
APPLICATION FILED SEPT. 9, 1905.
4 SHEETS—SHEET 1.
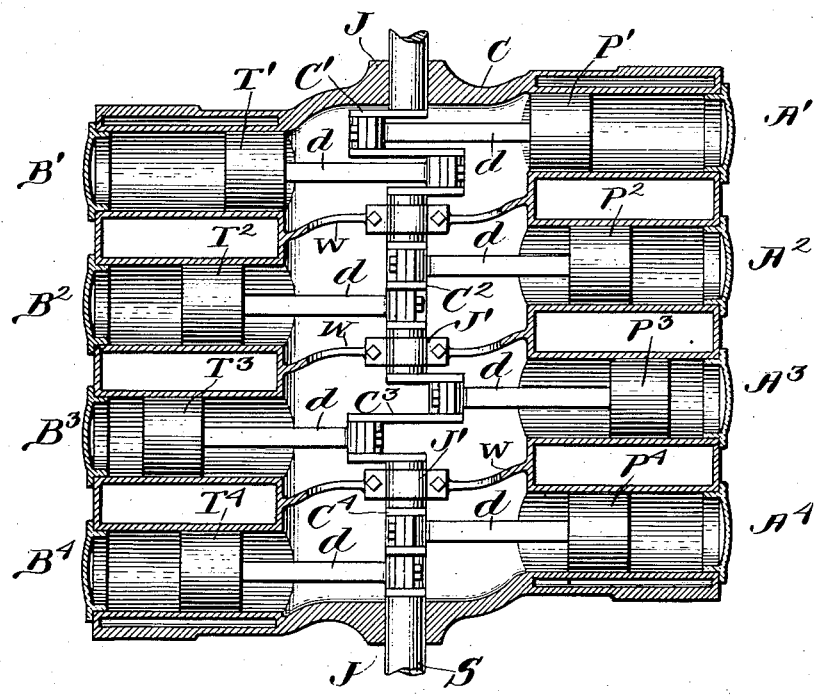
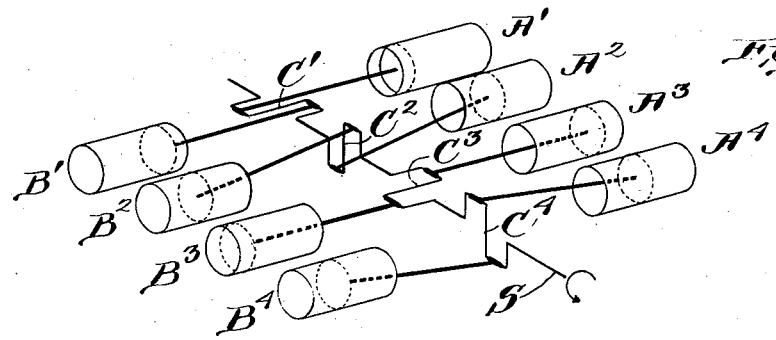

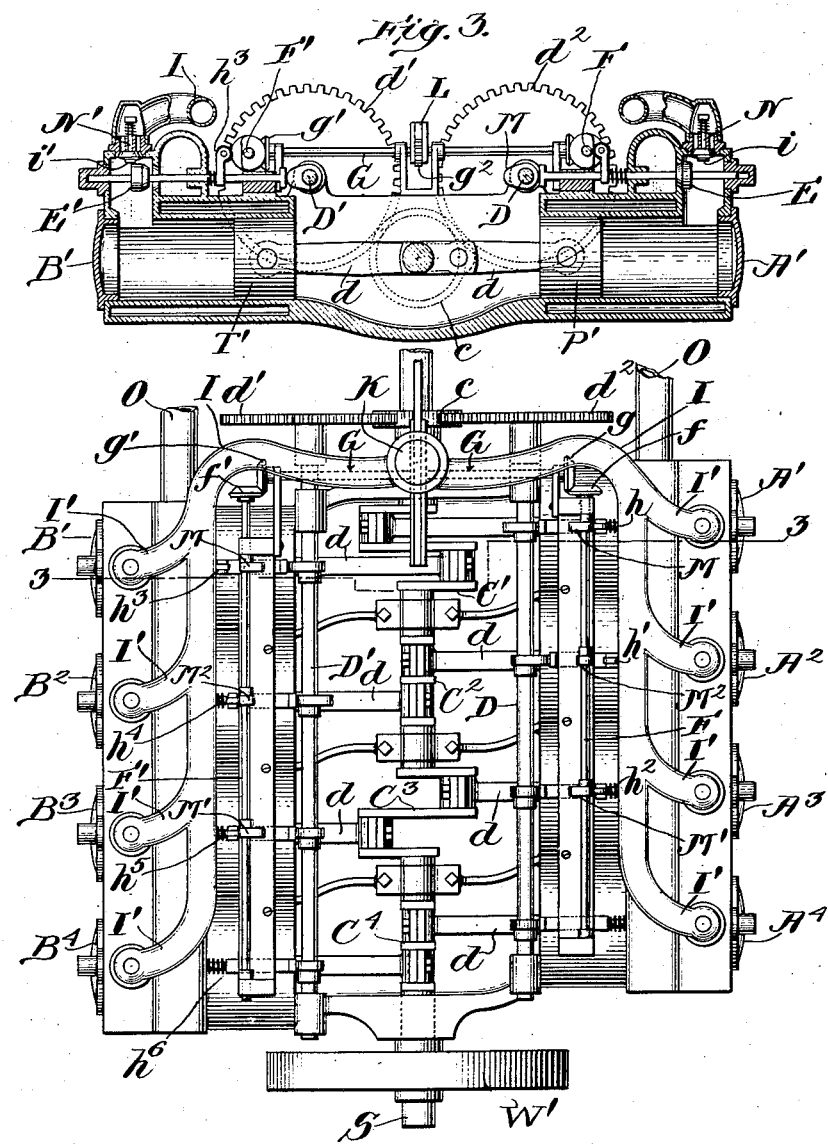

No. 869,021. PATENTED OCT. 22, 1907.
O. ROBERTS.
INTERNAL COMBUSTION ENGINE.
APPLICATION FILED SEPT. 9, 1905.

4 SHEETS—SHEET 3.

Witnesses:
Joseph T. Brennan.
Grace E. Gibbons.

Inventor:
Odie Roberts

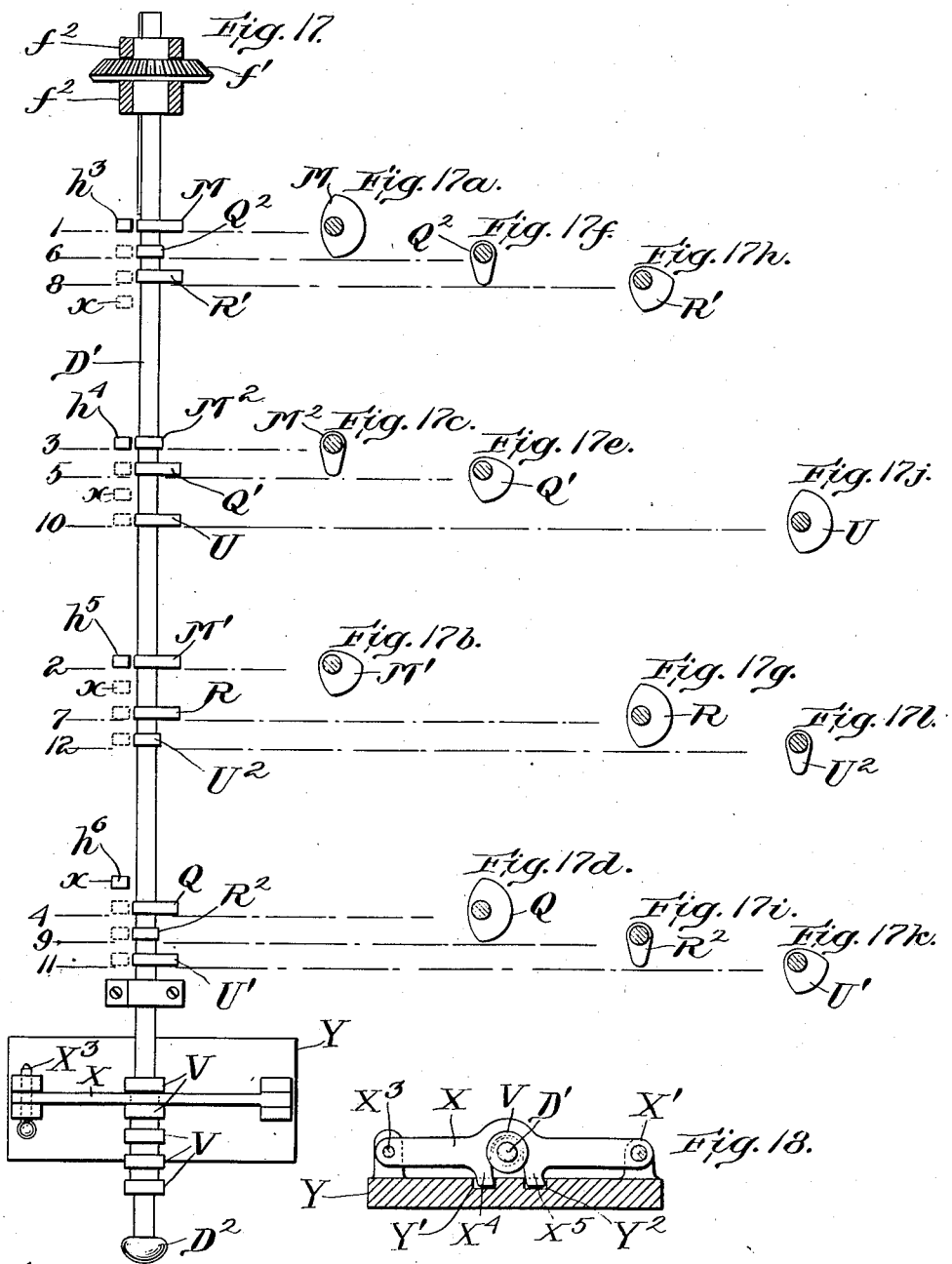

UNITED STATES PATENT OFFICE.

ODIN ROBERTS, OF DEDHAM, MASSACHUSETTS.

INTERNAL-COMBUSTION ENGINE.

No. 869,021.  Specification of Letters Patent.  Patented Oct. 22, 1907

Application filed September 9, 1905. Serial No. 277 676.

*To all whom it may concern:*

Be it known that I, ODIN ROBERTS, a citizen of the United States, and a resident of Dedham, in the county of Norfolk and State of Massachusetts, have invented new and useful Improvements in Internal-Combustion Engines, of which the following is a specification.

My invention relates to internal combustion engines, and has for its principal objects the attainment of a large range of power, preservation of exact balance of working parts, and the production of substantially constant and symmetrically distributed torque upon the engine shaft. For these purposes by preference I adopt as the working unit an engine having two opposed cylinders and reciprocating parts which are balanced in respect to their weight and movement and in which also the application of power is regular in respect to the intervals and timing of ignition. I regard the opposed cylinder pair as the best example of such a unit, and will describe my invention as embodied in an engine whereof the assembled working units are such opposed pairs.

Figure 5:
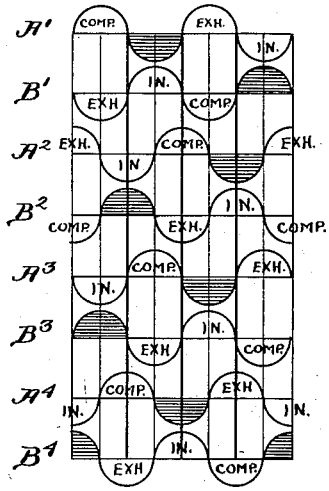
Figure 6:
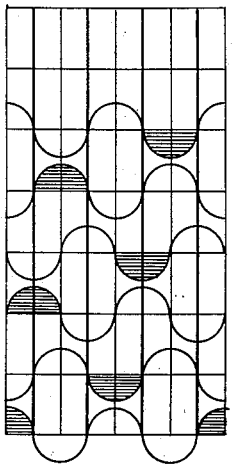
Figure 7:
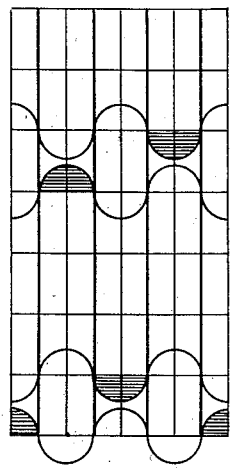
Figure 10:
Figure 12:
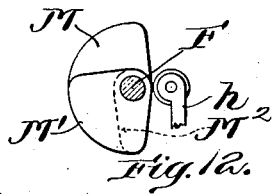
Figure 13:
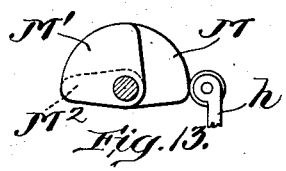
Figure 14:
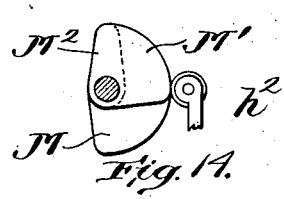
Figures 11, 15, 16:
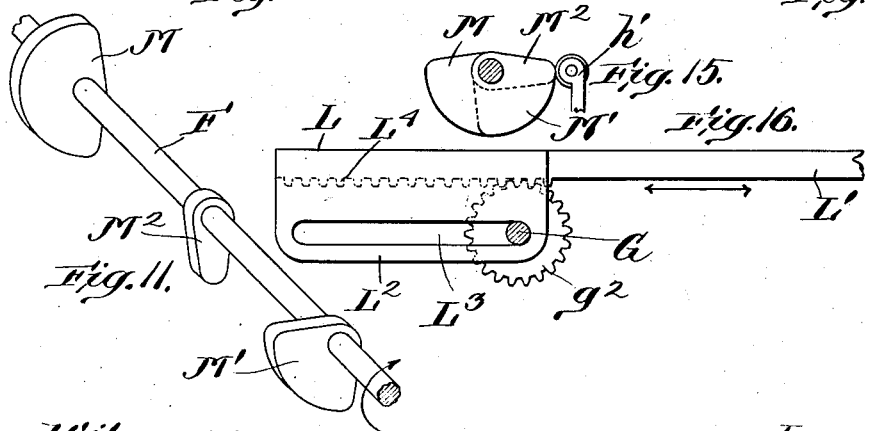

In the drawings hereto annexed Figure 1 is a horizontal section of the engine case, showing the arrangement of crank shaft and piston connections; Fig. 2 is a skeleton perspective view, showing the same; Fig. 3 is a cross section on the line 3—3 of Fig. 4; Fig. 4 is a plan view of the engine; Figs. 5, 6 and 7 are torque diagrams; and Figs. 8, 9 and 10 torque diagrams showing the effective resultants of Figs. 5, 6 and 7, respectively; Fig. 11 is a detail showing the power cut out cam shaft in perspective; Figs. 12, 13, 14, and 15 show different positions of the said cam shaft; Fig. 16 is a detail showing the mode of control of the said cam shaft; Fig. 17 is a modification of the power control cam shaft, and Figs. 17$^a$ to 17$^1$ inclusive sections at the dotted lines 1 to 12 inclusive, respectively, of Fig. 17; and Fig. 18 is an end view of the shaft shown in Fig. 17.

The economy and safety of operation of internal explosion engines are at the present day to some degree offset by the inherent limitations of such engines in respect to their range of efficiency, which is decidedly inferior to that of the steam engine. Moreover, the intermittent exertion of the power by explosion in the almost universally adopted Otto cycle renders it difficult to maintain that nice balance of moving parts which is essential to smooth running, and even when, as is the case with the best forms of high speed internal combustion engines, constancy of shaft torque is approximated by multiplying the number of cylinders, the effort is exerted only at one side of the shaft, and in the widely used four cylinder type of motor the cranks are disposed in the same plane, so that the difficulties due to dead-point remain without remedy other than the fly wheel. Further, the requirements of motor vehicles especially demand high power for hill climbing, rough and sandy roads, or speeding; and it is well known that in the extreme instance of racing vehicles the internal combustion engines are of so high power that it is impossible to run them at the moderate speed required for street travel. Touring cars are provided with speed reducing gear transmission, but for very low rates of travel, as required in city streets, the employment of low speed gearing involves waste of fuel, the rotative velocity of the engine being kept unduly high. Other disadvantages of this method of vehicle speed reduction are well known.

I am aware that it has been proposed to increase the effective power-range of engines of the internal combustion class by employing three or four cylinders, coupled to the crank shaft, and providing means to suspend the cycle of operation in one or more of the cylinders, as by holding the exhaust valve open and the intake valve shut, so that the cylinder or cylinders remaining in operation may be supplied with a full fuel charge at each cycle, and thus operate with greater certainty than when the charge is greatly reduced and the spark retarded. In the instances of such control which have come within my observation, the elimination of one or more cylinders from activity leaves the remainder out of balance, and subject to irregularly sequent explosions and it may safely be inferred that an engine, say of four cylinders, properly balanced for full operation, would work but ill with one, two or three cylinders cut out of power exertion. The experiences of motor vehicle drivers whose engines "skip" lend sufficient testimony to this.

In the improvements presently to be described, the application of the explosive power is evenly distributed on both sides of the crank shaft, the power-units remain perfectly balanced, in respect to moving parts, and the sequence of explosive efforts remains regular in its intervals whether part or the whole of the system is in active operation, and when the engine is in full operation there is no dead-point. Assuming that each engine-unit has an effective renge of from five to fifteen horse power, (and by effective range I imply absence of undue throttling) if four such units are employed, the power range will be from five at the lowest to sixty horse power at the highest, limit; and the rate of travel of the vehicle equipped with such an engine may be varied correspondingly without change of gear transmission.

For the power-unit I select the opposed pair of cylinders, operating by the Otto cycle. With respect to cycle operation and to the movement of parts, this engine-unit is perfectly balanced, except for such slight oscillating effect as may be due to the offset of the cranks, and the application of power is continuous and regular except for the half-rotation which intervenes between each alternate power explosion. The power is applied first above and then below, the shaft, (assuming the engine to be horizontal) so that wear on the journals is much more evenly distributed than with engines whereof the cylinders are in parallel on one side of the shaft. If it be desired to eliminate the oscillating vibration of such an engine, the cylinders of the pair may be cast with the same axial line common to both and the connecting rods offset. In Figs. 1 and 2 are shown the construction and cycle relation of an engine composed of four such units, arranged horizontally, working upon a single crank shaft. The engine casting is made with a longitudinally central crank case C, which is divided transversely into compartments by webs W, which facilitate the distribution of oil by splash lubrication, strengthen the engine casting and serve as supports for the journals $J'$, which are provided in addition to the end journals J. The cylinder pairs are $A'$, $B'$, $A^2$, $B^2$; $A^3$, $B^3$; $A^4$, $B^4$; and the rods $d$ of the pistons $P'$, $P^2$, $P^3$, $P^4$, are joined to the double cranks $C'$, $C^2$, $C^3$, $C^4$, each 180° from its opposed piston rod, the opposed pistons being $T'$, $T^2$, $T^3$, $T^4$. The double cranks $C'$ and $C^3$ are in the same plane, while the double cranks $C^2$ and $C^4$ are in the same plane with each other. this plane lying at right angles to the plane of cranks $C'$ and $C^2$. The piston $P'$ is at its extreme forward position, the piston $P^3$ at its rearmost position, and the same relation obtains as to pistons $T'$ and $T^3$. Pistons $P^2$, $B^3$ and $T^2$, $T^4$ are at half stroke, but when these are at the next dead-point (Fig. 2) pistons $P^2$ and $T^2$ will be at their rearmost position and pistons $P^3$ and $T^4$ at their forward position.

Figure 8:

The timing of the cycles of the cylinders is controlled as usual by a cam shaft, valves and sparking igniters; this may be accomplished by various well known mechanical and electrical devices. The progression of the cycle is as follows. Assume cylinder $B^4$ to be in the middle of its power stroke the gaseous mixture having just been ignited. The shaft rotates as shown by the curved arrow in Fig. 2. Cylinder $A^4$ will be at the middle of its inhalation of explosive mixture. Cylinder $B^3$ will then be at the point of explosion and cylinder $A^3$ about to begin its inhalation. Cylinder $B^2$ will be at the middle of its compression stroke and cylinder $A^2$ at the middle of its exhaust or scavenging stroke. Cylinder $B'$ will be at the beginning of its exhaust stroke, and cylinder $A'$ at the beginning of its compression stroke. The torque effect of this cycle distribution is illustrated by the diagrams. Figs. 5 to 10. inclusive. Figs 5 and 8 showing the torque effect when the engine is in full operation. Fig. 5 shows the cycle of explosion, exhaust, inhalation and compression during two full rotations of the crank shaft, the cycle for each cylinder being indicated by the letter employed in Figs. 1 and 2 to designate the cylinder itself. The shaded half circles represent the power strokes of the several cranks, and the abbreviations "Comp." "Exh." "In." denote the periods of compression, exhaust, and inhalation, respectively. Reading the diagram of Fig. 5 from left to right it will be observed that the explosions follow one another in the order $B^4$, $B^3$, $B^2$, $A'$, $A^4$, $A^3$, $A^2$, $B'$; thus four power strokes on one side of the engine are followed by four power strokes on the other side, each power stroke being overlapped, in the rotation of the crank shaft, by its predecessor and successor. Fig. 8 shows the resultant of the torque illustrated in extenso by Fig. 5; it will be observed that the torque is almost completely constant, so constant indeed that with the engine running at full power no fly wheel will be required to maintain the requisite smoothness of action. Moreover as much effort is exerted at one side of the crank shaft as on the other, and the wear on the journals is kept even.

Figure 9:

Referring now to Fig. 3, which is a cross section at the line 3—3 of Fig. 4, (the carbureter and mixture pipe are omitted in Fig. 3); the arrangement of the cam shafts and valves is made clear. The cam shafts D and $D'$ are driven by gears $d'$ and $d^2$ both of which mesh with the gear $c$ on the shaft S. The exhaust valves E and $E'$ are positively operated in the usual manner; the intake valves N and $N'$ are here shown as automatic check valves. The timing of the exhaust valves need not be here further described. Mounted on the engine casing there are two manually operated cam shafts F and $F'$, parallel to the cam shafts D, $D'$. The shafts F and $F'$ carry cams M, $M'$, $M^2$, and followers for these cams are secured to or integral with the stems of the exhaust valves of the cylinders $A'$, $A^2$, $A^3$, and $B'$, $B^2$, $B^3$; these followers being shown at $h$, $h'$, $h^2$; $h^3$, $h^4$ and $h^5$ (see Figs. 3 and 4). The cam shafts F and $F'$ are provided with bevel gears $f$, $f'$, which mesh with bevel gears $g$, $g'$ on the transverse shaft G. At the middle of shaft G, there is mounted (see Figs. 3 and 16) a spur gear $g^2$, which meshes with the rack $L^4$ on bar L. This bar is provided with an apron $L^2$ whereof the slot $L^3$ embraces shaft G, and holds the gear $g^2$ and rack $L^4$ in mesh. The movement of the rack bar L is controlled by the rod $L'$, which connects with any suitable hand lever which may be provided. It will now be clear that as the rack bar L is moved forward or back, as indicated by the arrow of Fig. 16, the shafts G, F, and $F'$ will be turned, and the cams M, $M'$, $M^2$ be made to act upon their followers. The manner and the result of this action is illustrated in Figs. 11 to 14 inclusive. As the shafts F and $F'$ are alike in structure and operation, only one need be described in detail. Upon shaft F (Fig. 11) there are secured three cams, whereof M has a dwell surface for about 180°, $M'$ a dwell surface for about 90° and $M^2$ has practically no dwell. With rack bar L in the position shown in Figs. 4 and 16, the cams M, $M'$, $M^2$ are retired from action on the followers $h$, $h^2$, $h'$, and the exhaust valves of all three cylinders, A, $A^2$, $A^3$, are free to operate normally. If bar L be now moved about one third of its total traverse, cam M pushes back follower $h$, (and the corresponding cam M on shaft $F'$ pushes back follower $h^3$) so that the exhaust valves of cylinders $A'$ and $B'$ are held open. By this movement the exhaust valves pass under the lugs $i$, $i'$ respectively and the intake valves N, $N'$ are positively held closed. Cylinders $A'$, $B'$ are thus put out of action, and the pistons thereof are allowed to work freely without compression. The effect upon the shaft torque is shown by diagram Fig. 6, and the resultant torque by Fig. 9. The moving parts of the engine are balanced as before, and the explosion cycle also remains symmetrical and balanced, as shown in Fig. 9. Now if rack bar L be moved another third part of its traverse, cams M' operate on followers $h^2$, $h^5$ and cylinders $A^3$ $B^3$ are eliminated from active participation in the work of the engine. Referring to Figs. 7 and 10, the torque diagrams show that in this condition the cycle phases of the engine remain perfectly balanced and symmetrical. The cycle of the pair $A^2$ $B^2$ is in alternation with that of the pair $A^4$ $B^4$; this cycle alternation being illustrated in Fig. 7, a power stroke of the balanced pair $A^2$ $B^2$ being followed by a power stroke of the pair $A^4$ $B^4$, which in turn is followed by the next power stroke of the pair $A^2$ $B^2$. The pairs A' B' and $A^3$ $B^3$ are likewise in cycle alternation, as will appear from examination of Fig. 5. To reduce the power of the engine still further, move bar L to the end of its stroke, bringing cams $M^2$ into active relationship with followers $h'$, $h^4$, and cutting out cylinders $A^2$, $B^2$. The balanced pair $A^4$, $B^4$ remain in action, preserving the symmetry and balance of the cycle phase. The dwells on cams M and M' hold the cylinder pairs A', B'; $A^3$, $B^3$; out of action while the successive cams come into action.

A fly wheel W' is provided in order to insure smooth working of the engine when only one cylinder pair is in action. The carbureter K supplies the explosive mixture to pipes I whose branches I' lead to the intake valves. The details of ignition devices have been omitted from the drawings and description, as these may be readily supplied by the knowledge of those skilled in the art, as also the appurtenances to the exhaust passages O. With the arrangement of parts above described the cylinders $A^4$ $B^4$ would be subject to more constant duty than the others, and would consequently require more frequent overhauling and cleaning. In order to distribute the service more evenly among the cylinder pairs, I have contrived the devices shown in Figs. 17 and 18. In these figures the power cut out cam shaft D' is splined to slide in the gear wheel $f'$ which is mounted between brackets $f^2$. At the other end, the shaft D' is provided with collars V, five in number, so that between these collars are four circumferential grooves. A yoke X pivoted at X' upon the engine casing, or on a plate Y secured to the casing, straddles the shaft D', the arms $X^4$ $X^5$ embracing the shaft in one of the grooves between sleeves V V. A standard is provided to secure the handle end of yoke X, as by a catch pin $X^3$. The ends of arms $X^4$ $X^5$ fit into sockets Y' $Y^2$ in the plate Y. By lifting yoke X the shaft D' may be shifted endwise so that the yoke X may be placed in any one of the grooves between the collars V. Instead of three cams M M' $M^2$ as shown in Fig. 4, I arrange groups of cams, spaced between centers a distance equal to the spaces between centers of the collars V or the grooves between them. The yoke X is shown in Fig. 17 as in the first groove, holding shaft D' in position to render cams M, M', $M^2$ operative as in Fig. 4. To shift the shaft D', lift the yoke X and grasp the knob $D^2$, then push shaft D' until the next groove registers with yoke X, drop the yoke and secure it. Now cam Q, corresponding in shape and function to cam M, comes opposite follower $h^5$, which is carried by the exhaust valve stud of cylinder $B^4$; cam Q' comes opposite follower $h^4$ and cam $Q^2$ opposite follower $h^3$, these corresponding in shape and function to cams M' and $M^2$. Figs. $17^a$, $17^b$ and $17^c$ show the angular arrangement of cams M M' and $M^2$, while Figs. $17^d$, $17^e$ and $17^f$ show the angular arrangement of cams Q Q' $Q^2$. With cams Q Q' and $Q^2$, in operative position, successive rotative movements of the shaft D' cut out cylinders $B^4$, $B^2$ and B' in succession, leaving $B^3$ in operation. If the shaft D' be now shifted another groove space and locked by yoke X, the operative cams will be R, R' and $R^2$, shown in elevation in Figs. $17^g$, $17^h$ and $17^i$. Successive rotative movements of shafts D' will cut out cylinders $B^3$, B' and $B^4$ in succession, leaving $B^2$ in operation. Likewise, if the shaft D' be now shifted to the last position and locked by yoke X, cams U, U' and $U^2$ become operative; these are shown in elevation in Figs. $17^j$, $17^k$ and $17^h$, and cut out cylinders $B^2$, $B^4$ and $B^3$ in succession as shaft D' is rotated, leaving cylinder B' in operation. With a shaft D similarly equipped and on an engine such as shown in Figs. 1 2, 3, and 4 the cylinders A', $A^2$ $A^3$ $A^4$ can be alternately made the residual power units on this side of the engine. Obviously it is desirable to shift shafts D and D' together, to maintain the balance conserved by the arrangement shown in Figs. 1 to 16 inclusive.

Ordinarily, if jump spark ignition be employed an engine such as above described will start readily by spark ignition of gases retained in compression, but in the event of having to crank the engine, starting will be rendered very easy by throwing the exhaust valves of three pairs of cylinders to open position, when cranking will only have the compression of one cylinder to overcome.

The timing of the ignition may be arranged differently from that above described; for instance if all the cranks move in one plane the engine could be timed so as to have an explosion take place simultaneously on both sides of the engine so as to provide a torque characterized by a static couple at all times.

With an engine comprised of four horizontal opposed pairs, having cranks all in one plane the cycle symmetry may be practically conserved for conditions when one, two, three or four pairs are in operation.

What I claim and desire to secure by Letters Patent is:

1. In an internal combustion engine, an assemblage of opposed cylinders with balanced parts, means to eliminate from operation successive balanced portions of the assemblage cumulatively leaving the active residue in balance, and means to vary the operation of said alternating devices to change the location of the active residue in the assemblage.

2. In an internal combustion engine, an assemblage of opposed balanced pairs of cylinders, cam shafts and cams thereon to eliminate from active operation one or more of said opposed balanced cylinder pairs.

3. In an internal combustion engine, an assemblage of opposed cylinder pairs, means to eliminate from active operation cumulatively the said opposed pairs, said means comprising cam shafts and cams thereon, said cams arranged in sets, devices for bringing into operation any selected set of cams, the sets of cams being fashioned to leave a different active residue of the opposed pairs of cylinders in operation for each set of cams selected.

4. In an internal combustion engine, an assemblage of opposed cylinder pairs, a pair of cam shafts, each bearing cams, cam followers connected to the exhaust valves, cams fashioned to interrupt the action of the exhaust valves successively and cumulatively upon opposed cylinder pairs, and means to rotate the cam shafts.

5. In an internal combustion engine, an assemblage of opposed cylinder pairs, a pair of cam shafts, means to rotate the same, cam followers connected to the exhaust valves said shafts provided with means to shift them longitudinally to a succession of positions, sets of cams, one for each shaft position, upon said shafts, so fashioned as to eliminate from active operation, successively and cumulatively, the opposed cylinder pairs, each set of cams placed to leave an operative residue of cylinders different from the operative residue left by any other set of cams.

Signed by me at Boston this seventh day of September 1905.

ODIN ROBERTS.

Witnesses:
 CHARLES D. WOODBERRY,
 JOSEPHINE H. RYAN.